United States Patent [19]

Kanten

[11] 4,226,909
[45] Oct. 7, 1980

[54] COBALT-DOPED ACICULAR HYPER-MAGNETITE PARTICLES

[75] Inventor: Thomas M. Kanten, Baldwin, Wis.

[73] Assignee: Minnesota Mining and Manufacturing Company, St. Paul, Minn.

[21] Appl. No.: 935,749

[22] Filed: Aug. 21, 1978

Related U.S. Application Data

[62] Division of Ser. No. 736,744, Oct. 29, 1976, Pat. No. 4,137,342.

[51] Int. Cl.$^2$ ...................... C01G 49/06; C01G 49/08
[52] U.S. Cl. .................................... 428/329; 428/403; 428/539; 428/900
[58] Field of Search ............... 428/403, 900, 328, 329, 428/539; 427/127, 128, 132; 252/62.56; 75/0.5 AA

[56] References Cited

U.S. PATENT DOCUMENTS

| | | | |
|---|---|---|---|
| 3,117,933 | 1/1964 | Abeck et al. | 252/62.56 |
| 3,725,126 | 4/1973 | Haller et al. | 252/62.56 X |
| 3,897,354 | 7/1975 | Woditsch et al. | 252/62.56 X |
| 3,953,656 | 4/1976 | Tokuoka et al. | 428/900 X |
| 3,958,068 | 5/1976 | Umeki et al. | 428/900 X |
| 3,977,985 | 8/1976 | Umeki et al. | 75/0.5 AA X |
| 4,010,310 | 3/1977 | Kubota et al. | 428/900 X |
| 4,066,565 | 1/1978 | Sasazawa et al. | 252/62.56 |
| 4,069,367 | 1/1978 | Umeki et al. | 428/900 X |
| 4,122,216 | 10/1978 | Okazoe | 428/403 X |

*Primary Examiner*—Marion McCamish
*Attorney, Agent, or Firm*—Cruzan Alexander; Donald M. Sell; Robert E. Granrud

[57] ABSTRACT

Acicular hyper-magnetite particles, that is, acicular particles of $$(FeO)_xFe_2O_3$$

where x is greater than one and not greater than 1.5, are provided with coatings of a cobalt compound, the cobalt providing 1% to 10% of the total weight of the particles. The particles provide superior magnetic recording media.

4 Claims, No Drawings

COBALT-DOPED ACICULAR HYPER-MAGNETITE PARTICLES

This is a division of application Ser. No. 736,744, filed Oct. 29, 1976, now U.S. Pat. No. 4,137,342.

FIELD OF THE INVENTION

The invention relates to magnetic recording media having magnetizable coatings comprising magnetizable particles dispersed in nonmagnetizable binder and specifically concerns the magnetizable particles.

BACKGROUND OF THE INVENTION

Most magnetic recording media are based on acicular gamma-$Fe_2O_3$ particles, by "acicular" being meant that the particles have an average length-to-width ratio of more than 2. Typically the $H_c$ of such media may be about 300–350 Oersteds and possibly as high as about 400 Oersteds. It is known that by modifying such particles with cobalt ions in the form of cobalt oxide, the $H_c$ can be increased to substantially higher levels. Such increased $H_c$ enables improved storage of high frequency information.

While acicular gamma-$Fe_2O_3$ particles derive their magnetic anisotropy primarily from shape, modification with cobalt oxide introduces considerable crystalline anisotropy. As a result, the easy axis of magnetization tends to deviate from the physical or long axis. When heated and/or subjected to mechanical stress, an easy axis which deviates from the physical axis tends to shift its orientation or direction. Thus near-neighbor particles tend to interact magnetically and cause an irreversible decrease in the recorded magnetization. When the recording media are in tape form, the shift in orientation tends to result in undesirable layer-to-layer print-through characteristics. [See Flanders, P. J., "Changes in Recording Tape Magnetization Produced by Stress", IEEE Transactions on Magnetics, Vol. MAG-12, No. 4, page 348, July 1976.] The cobalt-containing acicular gamma-$Fe_2O_3$ particles of U.S. Pat. No. 3,117,933 (Abeck), had they been used commercially, would have been highly subject to the aforementioned instabilities. Considerable improvement was achieved in U.S. Pat. No. 3,725,126 (Haller et al.)

The recent trend toward thinner tape backings and recording at shorter wavelengths has created a need for better thermal and magneto-mechanical stability than that provided by present commercial recording tape which employs cobalt-containing acicular gamma-$Fe_2O_3$ particles. By converting some of the $Fe^{+3}$ to $Fe^{+2}$, the magneto-mechanical stability can be improved, but this may introduce another problem, i.e., significantly increasing $H_c$ during storage. In one case where 20% of the iron was $Fe^{+2}$ and the cobalt content was 1.2%, a tape experienced an increase in $H_c$ from 512 Oersteds to 763 Oersteds during 20 months' storage at ordinary room temperature. After 30 minutes at 100° C., the $H_c$ of the tape returned essentially to its original level and again began gradually increasing upon further storage at room temperature.

In recent attempts to eliminate the above-discussed problems, the cobalt has been applied to the surface of acicular iron oxide particles which in some cases have appreciable $Fe^{+2}$ content. For example, see TDK's U.S. Pat. Nos. 3,958,068; 4,069,367; 3,977,985; 3,953,656 and 4,010,310 and British Pat. No. 1,441,183; also Hitachi's Japanese patent application No. 143934/1974 (Publication No. J 510 70498). None of these patents or patent application[s] discloses the preparation of the acicular iron oxide core. Typical of these are TDK's U.S. Pat. No. 3,977,985 wherein the iron oxide is magnetite and No. 4,010,310 wherein the iron oxide has an $Fe^{+2}/Fe^{+3}$ ratio of 0.1 to 0.35. In each example of U.S. Pat. No. 4,010,310, an aqueous cobalt salt solution is added to an aqueous slurry of the particles and the cobalt is precipitated by means of added base as cobalt hydroxide onto the surfaces of the particles, followed by heating to dehydrate the hydroxide. At least two earlier steps were required to obtain the acicular iron oxide particles, namely, reduction and oxidation of a ferric oxide hydrate.

TDK has recently introduced into the U.S. a tape labelled "Avilyn" which appears to employ acicular iron oxide particles having a cobalt compound at the surface; IEEE Transactions on Magnetics, Vol. MAG-10, No. 3, page 655, September 1974. The "Avilyn" tape largely avoids the above-discussed problems. It is not known whether it was made by a process disclosed in any of the above-listed TDK German patent applications.

THE PRESENT INVENTION

The invention provides magnetic recording media which appear to be equivalent in performance to said "Avilyn" tape but employing magnetizable particles that are made by a process which is more simple and direct, and hence should be more economical than are the processes of the German patent applications listed above. Also the process of the present invention should be easier to control. It provides magnetizable particles which are different from those disclosed in the German patent applications. More specifically, the present invention concerns magnetic recording media based on acicular iron oxide particles, each having a core of

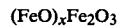

$$(FeO)_x Fe_2O_3$$

where x is greater than one but not greater than 1.5 as determined by titration, and surface layer comprising a cobalt compound. The cobalt in the surface layer provides 1–10% by weight of the particles.

Since the $Fe^{+2}$ provides more than one-third of the total iron, the core material may be referred to as hyper-magnetite. This $Fe^{+2}$ level should be significantly easier to achieve as compared to a level of 15–20% $Fe^{+2}$, and at significant savings in cost. The preferred level of 35–41% $Fe^{+2}$ (x=1.1–1.4) is readily attained with accuracy on a production basis which contrasts to the apparent difficulty in achieving an accurate $Fe^{+2}$ content by oxidizing wustite or reducing gamma-$Fe_2O_3$. The product quality at an $Fe^{+2}$ level approaching $33\frac{1}{3}\%$ is equivalent to that realized at the preferred level of 35–41%, but one has better assurance of achieving an $Fe^{+2}$ level of more than $33\frac{1}{3}\%$ if one formulates the process to achieve at least 35%. Should one fail to achieve at least $33\frac{1}{3}\%$ by the single-step process of the present invention, the desired magnetic properties would not be achieved. At levels of $Fe^{+2}$ exceeding 41%, the magnetic moment tends to be lower than desired.

The acicular hyper-magnetite core material can be produced by the single step of heating acicular alpha-FeOOH particles of submicron size in an inert atmosphere in the presence of a reducing agent such as hydrogen or a glyceride at about 300°–600° C., preferably for about 15 minutes. Preferably a long-chain fatty acid glyceride or mixture of long-chain fatty acid glycerides is used at a temperature of at least 400° C. The long chain may be straight or branched but should have at least 12 carbon atoms. Glycerides which are esters of acids having 16–18 carbon atoms are especially useful and may be employed in amounts of 3% to 10% by weight of the alpha-FeOOH, preferably about 5%. When using an organic reducing agent, the resultant core material includes a carbon-containing residue which may provide an oily film when the particles are slurried in water. The carbon may comprise about 0.5% to 3% of the total weight of the particles.

While mixing a slurry of this core material, a soluble cobalt salt and a compound which will insolubilize the cobalt ions are added sequentially to deposit cobalt-containing material onto the surfaces of the particles. The homogeneous mixture is filtered, and the cake is heated in an inert atmosphere at 80°–200° C. to fix the surface deposit. The heating is discontinued before substantial diffusing of the cobalt ions into the particle cores, since this would introduce the disadvantages discussed above. For the same reason the heating temperature should not exceed 200° C. At temperatures below 80° C., the process is unduly slow and inefficient. By adjusting the amount of the cobalt salt in the slurry, the cobalt ions in the coating may be controlled within the desired 1–10% of the total weight of the particles.

The $H_c$ of media made with the particles may be about 500 Oersteds where the cobalt ions provide about 1% of the weight and about 700 Oersteds at a cobalt content of 6% by weight, except that higher temperatures within the 80°–200° C. range tend to provide higher $H_c$. Cobalt contents above 6% by weight tend to reduce the $H_c$ which also is dependent upon average particle size, smaller particles tending to provide higher $H_c$.

EXAMPLE

Raw materials:
Acicular alpha-FeOOH particles, average length of 0.5 micrometer and length-to-width ratio of 10:1
Triglyceride of $C_{16}$–$C_{18}$ saturated carboxylic acids ("Neustrene" 059 of Humko Products Inc.)

Forty pounds (18.2 kg) of the FeOOH particles and two pounds (0.9 kg) of the triglyceride were charged to a 3-cubic-foot (0.085 m³) gas-fired rotary kiln. While maintaining a nitrogen purge of 3 cubic feet (0.085 m³) per minute, the contents were heated to 930° F. (500° C.) for 30 minutes and then cooled with water to room temperature. When cool, the contents were transferred, under a nitrogen atmosphere, to a steel container which was purged with argon. The container was sealed to maintain the inert atmosphere and placed in a glove box under nitrogen to prevent oxidation of the product. The $Fe^{+2}$ content of the resulting acicular particles was 38%, as determined by titration.

Using a high-speed, high-shear homogenizing mixer, 20 pounds (9.1 kg) of these acicular particles were slurried in 24 gallons (91 liters) of deionized water of conductivity less than 20 micromhos. 6.0 pounds (2.7 kg) of $CoSO_4 \cdot 7H_2O$ were dissolved in 10 gallons (38 liters) deionized water and added to the slurry, and the mixing was continued for 30 minutes. 1400 ml 29% aqueous $NH_3$ were then added. The pH rose to 9.1. The slurry was then pumped into a plate-and-frame-type filter. The solids was washed by reslurrying in 50 gallons (190 liters) deionized water and refiltering. The conductivity of the mother liquor after washing was less than 700 micromhos. The solids were charged to a rotary kiln while purging with nitrogen at 3 cubic feet (0.085 m³) per minute and heating to 250° F. (120° C.) After 15 minutes at that temperature, the kiln was cooled with water to room temperature while maintaining the nitrogen purge. The resultant particles has a carbon content of 1.8%, and each had a core consisting essentially of acicular $$(FeO)_x Fe_2O_3$$

where x was approximately 1.2, and a surface layer comprising a cobalt compound. The cobalt ions provided about 6% by weight of the particles.

A slurry was made of:
  800 grams of the cobalt-containing particles
  50 grams of the acetate salt of a polypropylene oxide quaternary amine of 2200 molecular weight
  15 grams of butyl myristate
  15 grams of fine alumina particles
  416 grams of a 30-weight-percent solution of a high-molecular-weight polyester-polyurethane polymer synthesized from neopentyl glycol, poly-epsiloncaprolactone diol, and diphenylmethane diisocyanate dissolved in dimethyl formamide
  836 gram toluene
  50 grams dimethyl formamide.

The slurry was charged to a one-gallon-capacity (3.8 liter) sandmill and milled until smooth, which required two hours. This was coated onto a biaxially-oriented polyethylene terephthalate web one mil (25 micrometers) in thickness. The wet coating was passed through a magnetic field to orient the acicular particles in the longitudinal direction and heated to drive off the solvents. After polishing to a surface roughness of 4.0 microinches (0.1 micrometer) peak-to-peak, the web was slit into tapes of standard tape widths. The thickness of its magnetizable layer was approximately 200 microinches (5 micrometers).

The magnetic properties of the tape, measured in the presence of a 3000-Oersted, 6C-Hertz field using an M versus H meter, were:
$\phi_r$=0.400 line per ¼ inch (0.6 cm) width of tape
$M_r/M_m$=0.81
$H_c$=632 Oersteds
$B_r$=1270 Gauss.

After storing the tape for 100 days at room temperature, its $H_c$ increased to 650 Oersteds. Extrapolation indicated that the $H_c$ should rise to 672 Oersteds after 20 months. Such increase would not cause any problems on ordinary recording and reproducing apparatus.

Performance characteristics of an endless loop of the tape were tested on a widely used professional-type audio recorder-reproducer ("Mincom" Series 400) which has been modified to employ a 7-track instrumentation head having a record-head gap of 200 microinches (5 micrometers). A signal of 0.1-mil (2.5-micrometer) wavelength was recorded on the tape at a tape speed of 15 inches (38 cm) per second. The output was 2.0 db higher than that provided by a loop of a reference tape, namely, a widely sold tape having a magnetizable coating of cobalt-modified acicular gamma-$Fe_2O_3$ particles. After 300 passes over the head, the output of the tape of this Example decreased 3.8 db, compared to a decrease of 7.5 db for the reference tape.

A roll of the tape of this Example was tested for print-through characteristics in accordance with DIN Standard No. 45519, Sheet 1 except the recorded signal was 1200 Hertz and the tape was stored at 150° F. (65° C.) for four hours. The signal-to-print ratio dropped 6 db from 46 db during the test whereas that of the reference tape dropped 17.5 db from 38 db.

I claim:

1. Acicular particles useful for magnetic recording media, each haviang a core consisting essentially of acicular $$(FeO)_x Fe_2O_3$$

wherein x is greater than one and not greater than 1.5, and a surface layer comprising a cobalt compound, the cobalt being substantially only at the surface and providing 1-10% by weight of the particle.

2. Acicular particles as defined in claim 1 having a carbon content of 0.5-3%.

3. Acicular particles as defined in claim 1 wherein x=1.1 to 1.4.

4. Magnetic recording media comprising a non-magnetizable carrier and a coating of acicular particles as defined in claim 1 dispersed in a nonmagnetizable binder.

* * * * *